United States Patent Office 2,745,167
Patented May 15, 1956

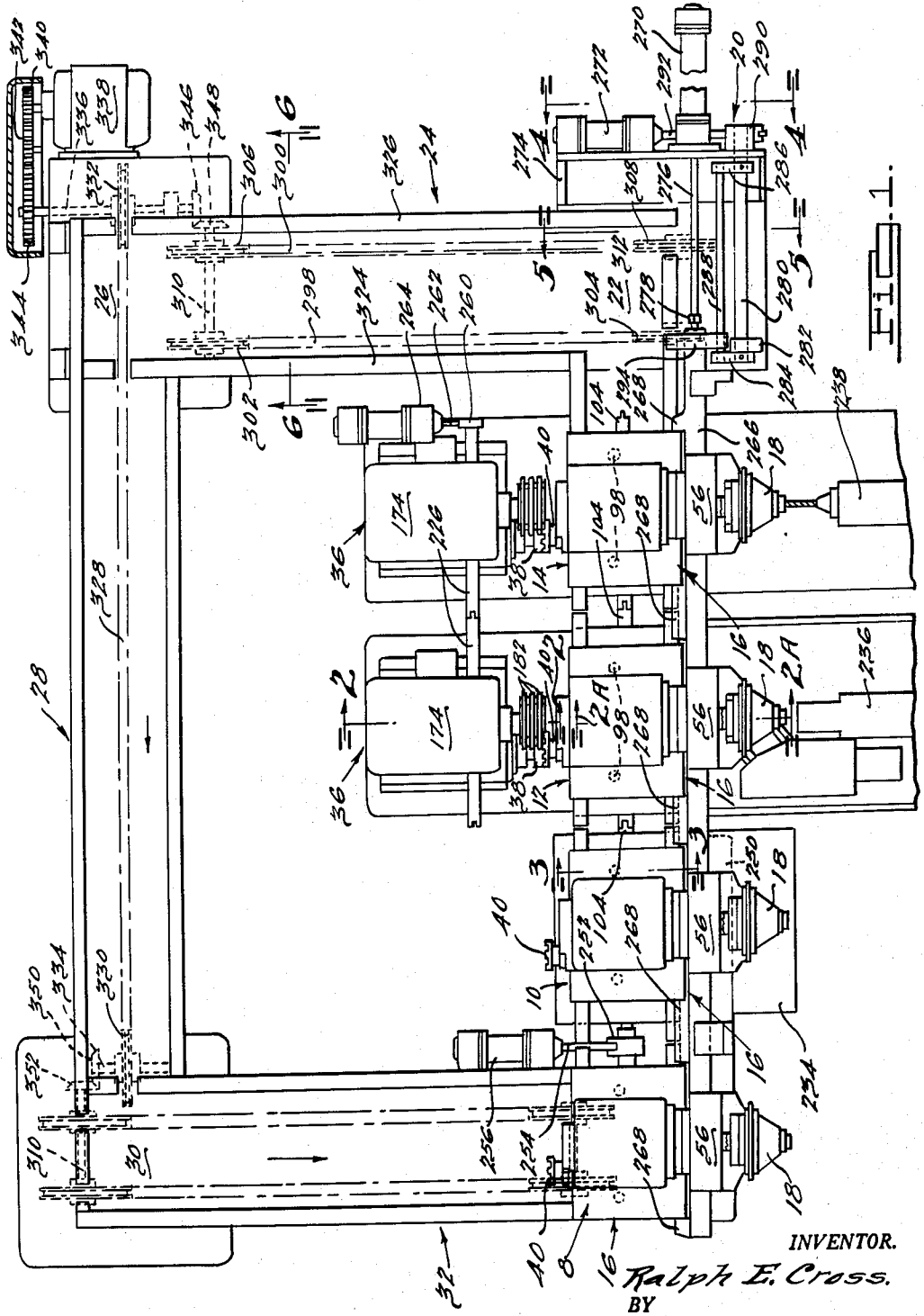

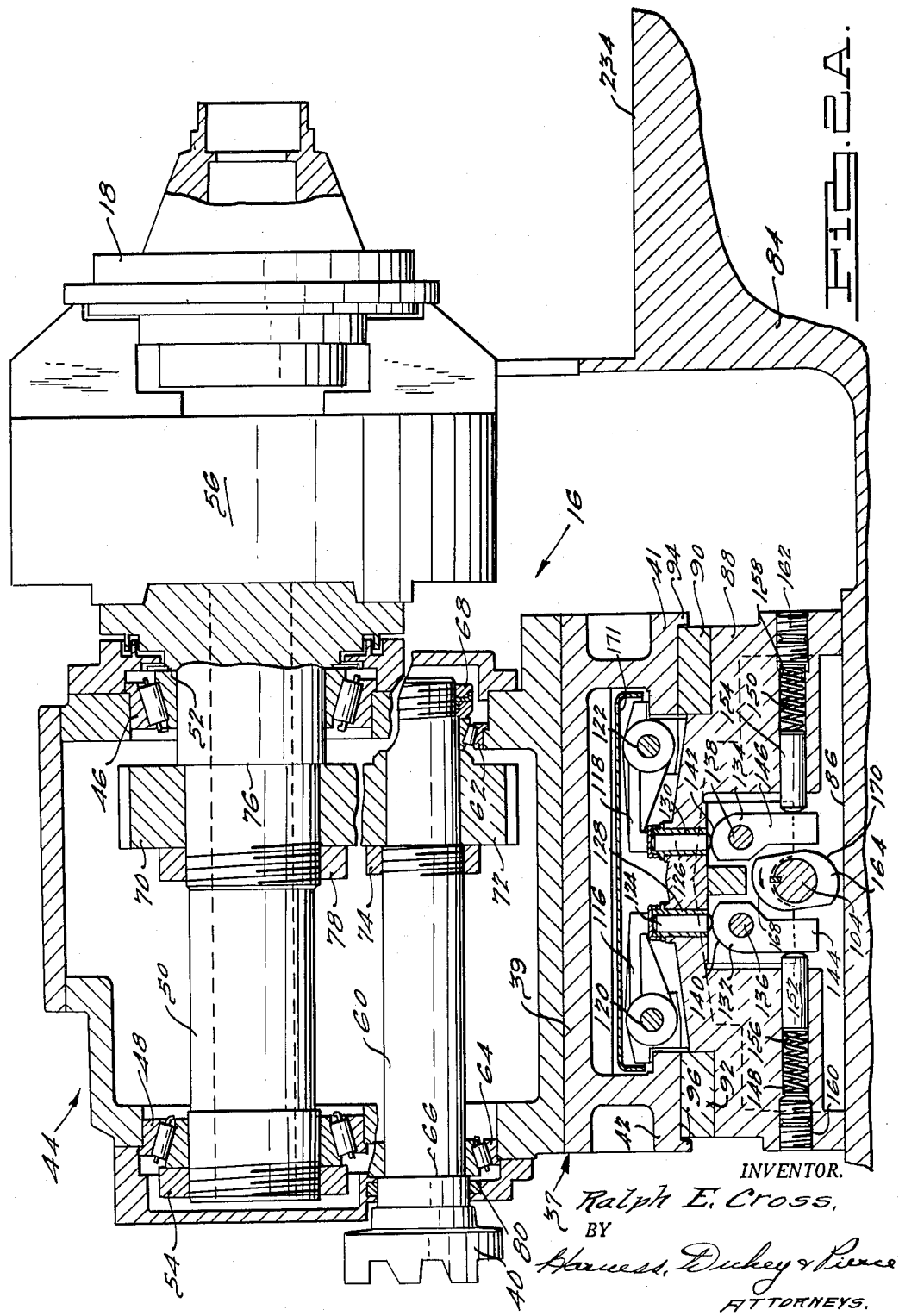

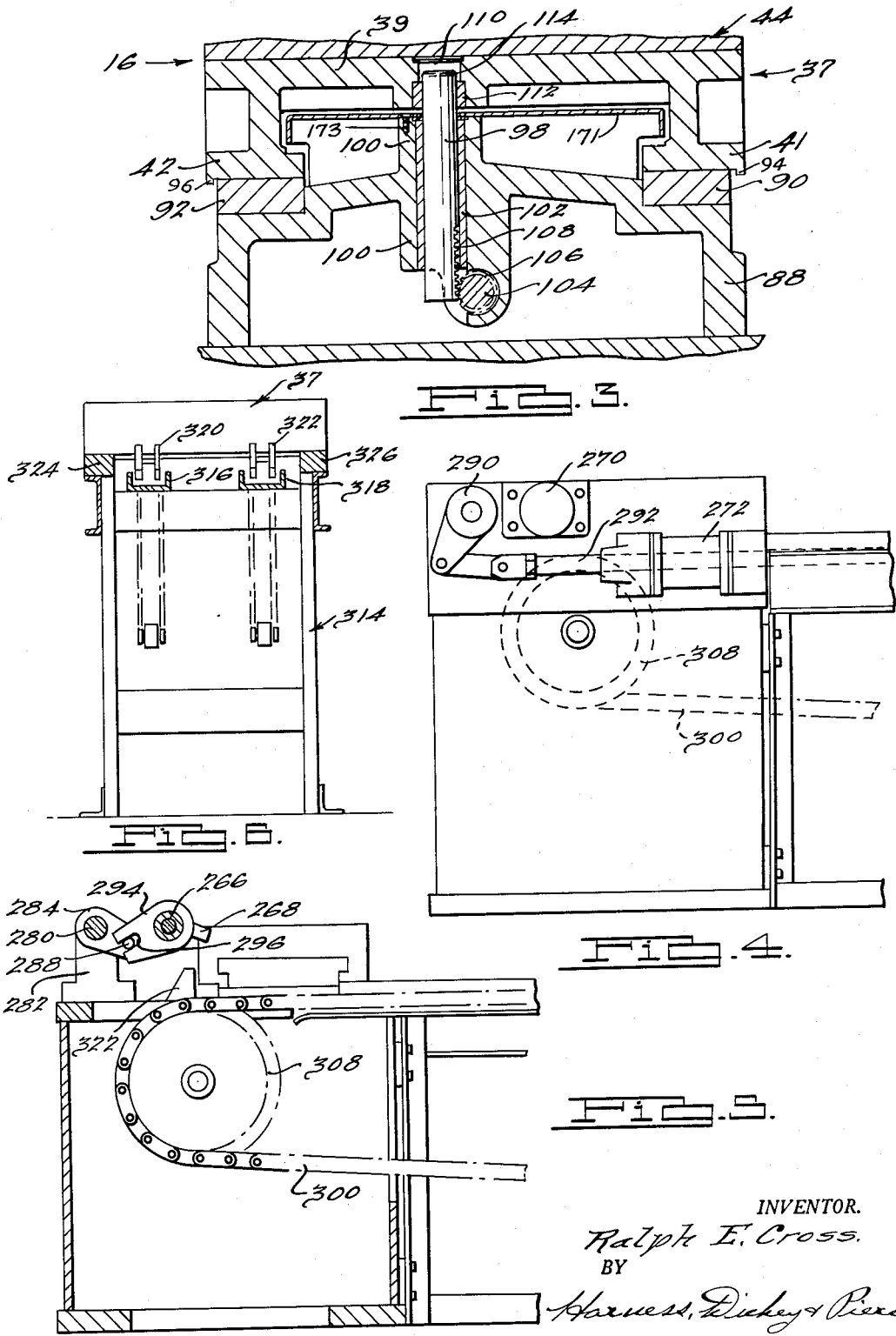

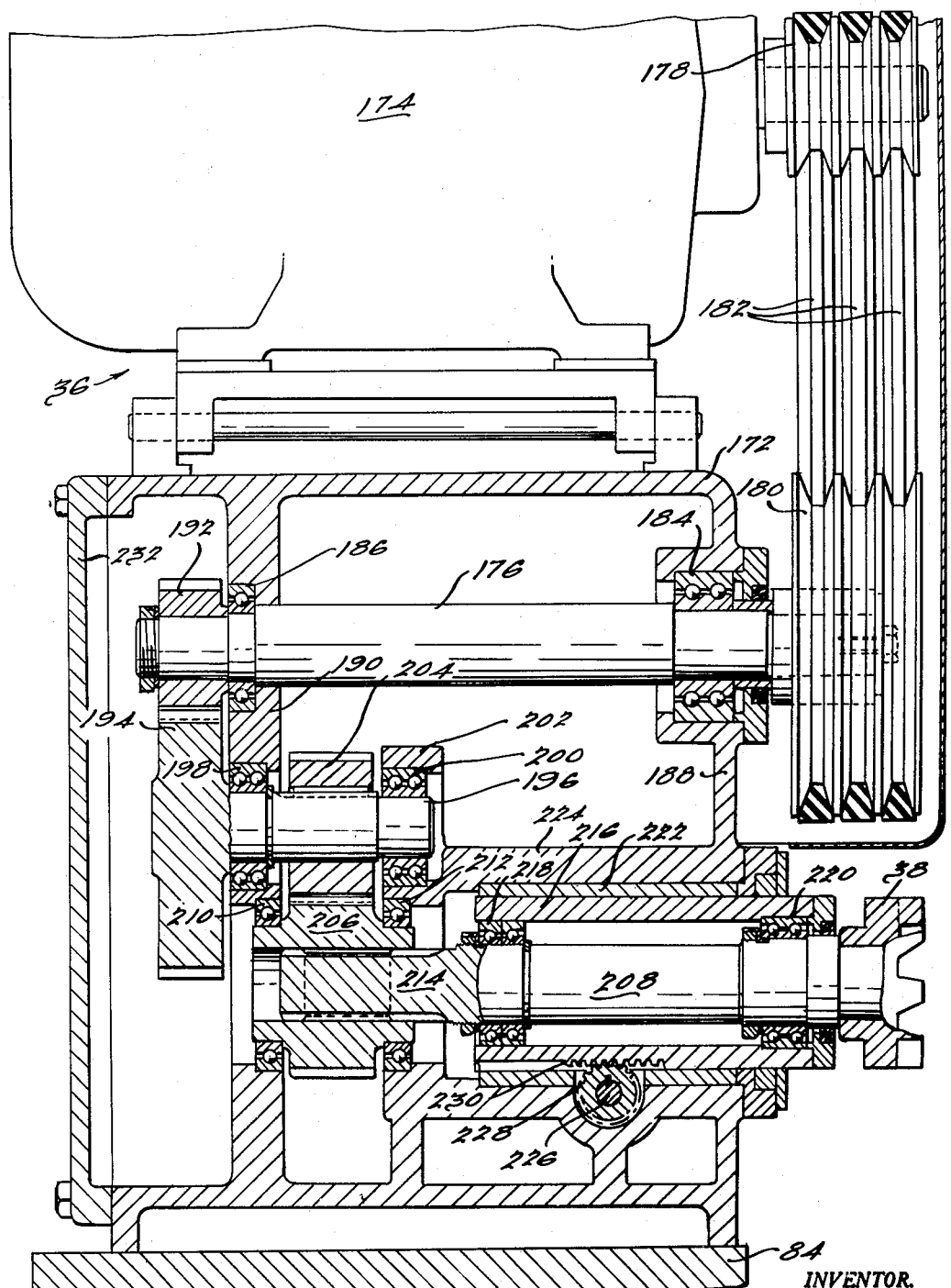

2,745,167

AUTOMATIC CHUCKING MACHINE

Ralph E. Cross, Grosse Pointe Shores, Mich., assignor to The Cross Company, Detroit, Mich., a corporation of Michigan Application December 24, 1949, Serial No. 134,933

15 Claims. (Cl. 29—33)

This invention relates to new and useful improvements in automatic chucking machines.

An important object of the present invention is to provide an automatic chucking machine that can be readily adapted to the requirements of a particular job.

Another object of the invention is to provide an automatic chucking machine that can be readily modified by altering the number or arrangement of work stations or by changing the operation to be performed on the work in any particular work station.

Still another object of the invention is to provide an automatic chucking machine that is uniquely constructed so that any desired number of work stations can be incorporated therein.

Yet another object of the invention is to provide an automatic chucking machine wherein work is chucked on a work carrier or portable headstock and the latter is indexed progressively through the work stations so that a plurality of separate operations can be performed on the work without releasing or changing the position of the latter.

A further object of the invention is to provide an automatic chucking machine having novel means for indexing the portable headstock so as to produce more accurate work.

A still further object of the invention is to provide an automatic chucking machine wherein the work stations are arranged in line and an independent drive is provided for each work station so that chatter or vibration generated in one station is not transferred to other stations through a common spindle drive mechanism as in conventional rotary type machines of this character.

A yet further object of the invention is to provide an automatic chucking machine which is uniquely constructed or fabricated from a number of self-contained units which are uniquely assembled and correlated to facilitate manufacture and repair.

Still another object of the invention is to provide an automatic chucking machine wherein each individual work station can be readily adapted to either rotate the work or to hold it stationary, according to the particular operation to be performed thereon.

Other objects and advantages of the invention will be apparent during the course of the following description.

In the drawings forming a part of this specification and wherein like numerals are employed to designate like parts throughout the same, Fig. 1 is a top plan view showing an automatic chucking machine embodying the invention;

Figs. 2 and 2A are enlarged, vertical, sectional views taken on the line 2—2 of Fig. 1;

Fig. 3 is an enlarged, fragmentary, vertical, sectional view taken on the line 3—3 of Fig. 1;

Fig. 4 is an enlarged, fragmentary, end-elevational view looking in the direction of the arrows 4—4 in Fig. 1;

Fig. 5 is an enlarged, vertical, sectional view taken on the line 5—5 of Fig. 1; and Fig. 6 is an enlarged, vertical, sectional view taken on the line 6—6 of Fig. 1.

Considered in certain of its broader aspects, the present invention comprises a multiple-station machine tool having a series of in-line stations. The first station in the series preferably is a loading and unloading station, and the other stations are work stations where various machining operations are performed. Each station includes a track section which extends entirely therethrough and aligns with corresponding track sections in adjacent stations. Also, each station has means for locating the portable headstock and means for clamping the headstock solidly in the located position. The work stations have rotary drive mechanisms which include driving couplings. The work is chucked or otherwise fastened to the headstocks which are moved from one station to another on the track sections. In the form of the invention shown, the headstocks also include mechanisms for rotating the workpieces carried thereby, and these mechanisms include driven couplings which are engageable with the driving couplings of the work stations occupied by such carriers. After the machining operations in the work stations are completed, all of the headstocks are advanced one station by an indexing mechanism. The headstock moved from the last work station is picked up by an automatic transfer mechanism and preferably returned to a conveniently located transfer point where it is positioned for movement into the loading and unloading station by the next operation of the indexing mechanism. The operator removes a finished workpiece from the headstock in the loading and unloading station and loads a new workpiece to be processed. The number of work stations in any particular machine depends upon the number and nature of the operations to be performed on the work. All of the operations except the single operation of loading and unloading the headstock in the loading and unloading station can be made fully automatic, if desired.

Reference is first had to Fig. 1 which shows a multiple-station machine tool embodying the invention. The machine here shown by way of illustration is adapted to handle simultaneously four headstocks each having a single work-carrying spindle and the machine also has a transfer station 8, a loading and unloading station 10, and two work stations 12 and 14. A headstock 16 is disposed in each of the stations 8, 10, 12, and 14, and, as suggested, each headstock is adapted to carry a workpiece 18. Mechanism designated generally by the numeral 20 is provided for simultaneously indexing the headstocks 16 from station to station. The headstock 16 indexed from the last work station 14 is moved to a transfer station 22 where it is picked up by a conveyer 24 which moves it to a second transfer station 26 where it is picked up by a conveyer 28 and moved to a transfer station 30. At this point the headstock 16 is picked up by a conveyer 32 which moves it to the transfer station 8 preparatory to the next operation of indexing mechanism 20 which moves it into the loading and unloading station 10. The operator attending the machine removes a finished workpiece from the headstock 16 in station 10 and fastens a new workpiece thereon.

Each of the work stations 12 and 14 is provided with a driving unit 36, and each driving unit has a rotatable and reciprocable driving coupling 38 which engages a driven coupling 40 on the headstocks 16 disposed in the stations to rotatably drive the work 18. Also, the loading and unloading station 10 and the two work stations 12 and 14 are equipped with mechanisms (not shown in Fig. 1) for locating the headstocks 16 in such stations for proper engagement with driving couplings 38 and/or transfer mechanism 20, as well as mechanism for clamping the headstocks securely in the located position. Means is provided interconnecting the clamping and locating mechanisms of the stations 10, 12, and 14 and for co-ordinating the mechanisms which move the drive couplings 38 into and out of engagement with the driven couplings 40.

It will be readily apparent, of course, that any or all of the above operations can be performed independently if desired; however, means preferably is provided for co-ordinating the various functions of the machine so that they are performed automatically and in proper sequence. Any suitable or conventional means may be provided for controlling and co-ordinating the various operations of the machine. When this is done, it is merely necessary for the operator to load and unload parts at station 10 and to press the usual starter switch to begin each cycle of operation.

All of the headstocks 16 here shown are identical in construction and operation and a detailed description of one thereof will suffice. Each headstock 16 comprises a supporting pallet 37 (Fig. 2A). The pallet 37 here shown is in the form of a casting having an essentially rectangular top deck portion 39 and depending front and rear runners 41 and 42. Surmounting and suitably fastened to the pallet 37 is a housing 44 having end bearings 46 and 48 which rotatably support a horizontal spindle 50. Axial movement of the spindle 50 is prevented by an annular shoulder 52 which seats rearwardly against the front bearing 46 and a nut 54 on the spindle which engages the rear bearing 48. It will be observed that the spindle 50 projects forwardly of the housing, and the projecting portion thereof is equipped with a chuck 56 which carries the workpiece 18. Any suitable or conventional chuck 56 may be employed in so far as the present invention is concerned. The chuck 56 employed in any particular instance, of course, may vary considerably, depending upon the size and shape of the work 18 and upon the particular machining operations to be performed thereon. Below and parallel to the shaft 50 is a shaft 60 which is supported for rotation in the housing 44 by front and rear bearings 62 and 64. Axial movement of the shaft 60 is prevented by a radial shoulder 66 thereon which seats forwardly against the rear bearing 64 and a nut 68 on the forward end of the shaft. A gear 70 on shaft 50 meshes with a driven gear 72 on the shaft 60. Both gears 70 and 72 are keyed or otherwise fixed to their respective shafts. In the particular form of the invention here shown by way of illustration, the gear 72 is held solidly against the inner race of the front bearing 62 by a nut 74 provided on the shaft 60 behind the gear. Similarly, the gear 70 is held solidly against a radial shoulder 76 on the shaft 50 by a nut 78 which is threaded on the shaft behind the gear. Drive shaft 60 projects rearwardly of the housing through a sealing gland 80 and the projecting end thereof carries the driven coupling 40.

As the headstock 16 is moved into each work station it is positioned with the driven coupling 40 in alignment with the driving coupling 38 of such station; and, after the headstock is properly clamped in the manner hereinabove described, the driving coupling 38 is slidably actuated to engage the driven coupling 40 whereby to establish a rotary drive for the work 18.

In each of the work stations 12 and 14 is an elongated base casting 84 which is arranged transversely to the direction of travel of the headstock 16. The casting 84 is adapted to support the headstock during its travel through the station and it carries the mechanism for locating and clamping the headstock in the station. Also, the base casting 84 carries the rotary drive unit 36 and the machine tool required to perform the necessary operation on the work 18.

At substantially the middle of the base casting 84 is a flat horizontal supporting surface 86 which supports a housing 88 bolted or otherwise fastened thereto. Horizontal parallel rails 90 and 92 on the housing 88 support the headstocks 16 as they move through the station. The runners 41 and 42 slide on rails 90 and 92, respectively, and the top surfaces of the rails are suitably hardened or otherwise treated to withstand abrasion and wear to which they are subjected in use. Runners 41 and 42 preferably are provided with depending flanges 94 and 96, respectively, which extend along the outer edges of the rails and guide the headstock 16 thereon.

The headstock 16 is located in the work station by vertical locating pins 98 which are mounted for vertical sliding movement in embossments 100 formed integrally with the top of housing 88. The location and arrangement of the pins 98 is shown in Fig. 1 and a detailed showing of a pin assembly is shown in Fig. 3. Any suitable or desirable number of locating pins 98 may be employed. In the form of the invention here shown by way of illustration, two pins 98 are provided adjacent opposite ends of the housing 88 and suitable bushings 102 are provided in embossments 100 to support the pins properly for sliding movement. Pins 98 are raised and lowered simultaneously by a horizontal shaft 104 which extends through and is suitably supported for rotation by housing 88. As clearly shown in the drawings and particularly in Fig. 3, shaft 104 is disposed at one side of and in proximity to locating pins 98 so that gears 106 fixed thereon mesh with racks 108 on the lower portions of the pins.

When the pins 98 are raised as shown in Fig. 3, they project upwardly into openings 110 in the top deck portion of pallet 37. Suitable bushings 112 press-fitted in the openings 110 snugly receive the pins 98 to precisely locate the pallet. If desired, the upper end of the locating pins may be tapered as shown at 114, to facilitate insertion of the pins into bushings 112. By rotating shaft 104 in a counterclockwise direction, as viewed in Fig. 3, the pins 98 actuated thereby are lowered to disengage pallet 37, and by rotating the shaft in a clockwise direction the pins are raised to engage the pallet. Any slight misalignment of the headstock 16 in the station is corrected as the locating pins 98 are pressed upwardly into bushings 112.

The properly located headstock 16 is clamped solidly during the machining operation by a pair of pivoted clamping arms 116 and 118 which are mounted on the housing 88 between rails 90 and 92 (Fig. 2A). The pivots 120 and 122, which support clamping arms 116 and 118, are disposed parallel to tracks 90 and 92. It will be observed that clamping arms 116 and 118 extend outwardly from pivots 120 and 122 and that the arms are spaced sufficiently above tracks 90 and 92 to accommodate the runners 41 and 42 therebetween. Arms 116 and 118 also extend inwardly from pivots 120 and 122 and the inwardly projecting portions of the arms rest upon vertically slidable pins 124 and 126 which are supported by and extend through the top of housing 88. Suitable bushings 128 and 130 are provided around the pins 124 and 126 according to conventional practice. Clamping cams 132 and 134 mounted on pivots 136 and 138 below pins 124 and 126 have cam surfaces 140 and 142 which support the pins and depending arm portions 144 and 146 which are acted upon from the outer sides thereof by springs 148 and 150 through the medium of pins 152 and 154. In this connection it will be observed that springs 148 and 150 and their respective pins 152 and 154 are disposed in horizontal bores 156 and 158 in housing 88. Adjusting screws 160 and 162 in the bores 156 and 158 behind springs 148 and 150 confine the springs in the bores and also permit the pressures exerted by the springs against pins 152 and 154 to be selectively controlled. When the parts are positioned as shown in Fig. 2A, the springs 148 and 150 hold arms 116 and 118 in clamping engagement with runners 41 and 42.

Shaft 104 extends between the cam arms 144 and 146, and a cam 164 is keyed or otherwise fixed on the shaft. When cam 164 is positioned as shown in the drawings, it is entirely disengaged from cam arms 144 and 146; however, if the cam is rotated in a counterclockwise direction as indicated by the arrow in Fig. 2A, the cam surfaces 168 and 170 engage the cam arms 144 and 146 and rock the cams 132 and 134 about pivots 136 and 138. This action retracts pins 152 and 154 to compress springs 148 and 150 and causes cam surfaces 140 and 142 to release pins 124 and 126. In this connection it will be observed that the cam surfaces 140 and 142 are shaped so that they fall away from the pins as the cams 132 and 134 are rocked or oscillated by cam 164. Contrariwise, when arms 144 and 146 are released by cam 164, springs 148 and 150 act through pins 152 and 154 to rock the arms inwardly. This action causes cam surfaces 140 and 142 to raise pins 124 and 126. As pins 124 and 126 move upwardly they act against the inner ends of clamping arms 116 and 118 and press the outer terminal portions thereof downwardly against runners 41 and 42 whereby to bind the runners solidly against rails 90 and 92.

In connection with the foregoing, it will be observed that considerable movement of shaft 104 takes place before cam 164 engages arms 144 and 146. When the cam 164 is moved in the direction of the arrow in Fig. 2A, this movement is utilized to disengage the locating pins 98. Thus, the pins 98 are disengaged from the pallet 37 before the latter is released by clamping arms 116 and 118. On the other hand, initial rotary movement of cam 164 in a reverse direction is utilized to engage the locating pins 98. In this manner pins 98 operate to locate or position the headstock 16 properly before it is clamped.

A shield or guard 171 carried by the base housing 88 covers the locating and clamping mechanisms and prevents chips and the like from falling on and interfering with the operation of the mechanisms. The guard 171 can be mounted on the housing in any suitable manner and is here shown supported on the embossments 100 and fastened thereto by screws 173 with the locating pins 110 extending upwardly through openings in the guard.

Each driving unit 36 comprises a housing 172 mounted on the base casting 84 at the inner side of the housing 88. Surmounting the housing 172 is a motor 174 which drives a shaft 176 through the medium of pulleys 178 and 180 and endless belts 182. Shaft 176 is arranged horizontally within the housing and is supported for rotation by bearings 184 and 186 carried by the end wall 188 of the housing and a vertical partition 190 respectively. A gear 192 on the end of shaft 176 remote from pulley 180 meshes with a gear 194 on a shaft 196. The shaft 196 is supported for rotation by bearings 198 and 200 in partition 190 and wall 202 respectively. A second gear 204 on shaft 196 meshes with a gear 206 on a rotatable and slidable shaft 208. In the latter situation gear 206 is independently rotatably supported by bearings 210 and 212 carried by partition 190 and wall 202 and shaft 208 is formed with a splined end 214 which extends through gear 206. By reason of the splines on end 214, shaft 208 is independently movable axially in gear 206, and the latter rotatably drives the shaft in all axial positions thereof. In this connection it will be observed that shaft 208 is supported for rotation in a sleeve 216 by bearings 218 and 220 and the sleeve in turn is slidably supported by a bushing 22 in an internal embossment 224 of the housing 172. Axial movement is imparted to shaft 208 by a shaft 226 carrying a gear 228 which meshes with a rack 230 on sleeve 216.

When shaft 226 is rotated in a clockwise direction as viewed in Fig. 2, shaft 208 is advanced, and, when shaft 226 is rotated in the reverse direction, shaft 208 is retracted. The end of shaft 208 remote from the splined end 214 projects from sleeve 216 and from housing 172, and the projecting portion thereof carries driving coupling 38 which engages the driven coupling 40 in the manner hereinabove described to rotatably drive the work 18. If desired, gears 192 and 194 may constitute change gears that can be substituted according to conventional practice to control the speed ratio between the drive shaft of motor 174 and the work 18. To this end the housing 172 is provided with a removable cover 232 which permits ready access to be had to the gears 192 and 194.

The outer portion of base casting 84 has a flat top surface 234 suitable for mounting the machine tool which is to perform work on workpieces carried through the station. In the drawings 236 and 238 for performing external and internal turning operations on the work 18 are shown at stations 12 and 14 respectively. However, it is contemplated that any suitable or conventional machine may be used. The particular machine required in any particular instance will vary, of course, depending upon the nature of the operation to be performed on the work. In the apparatus here shown the work 18 is rotated and the machines 236 and 238 operate to move cutting tools against the work. However, it is contemplated that if desired, the work 18 may be stationary and the tool may be rotated as in conventional boring operations. In the latter instance it would be necessary, of course, to provide suitable means for holding the work stationary at all times.

The machine units are lined up side by side with the track sections 90 and 92 in alignment and in slightly spaced but substantially abutting engagement so that the headstocks 16 may be moved from station to station on the tracks.

The unit in the loading and unloading station is identical to the units in work stations 12 and 14 except that the drive portion 36 and the outboard machine tool supporting portion are omitted. It is desirable to locate and support the headstock 16 in the loading and unloading station 10 to prevent it from being inadvertently pushed out of position during loading or unloading of the work 18 and as assurance that the headstock will be positioned properly for engagement by the indexing mechanism 20.

The three shafts 104 in stations 10, 12 and 14 are suitably coupled together for mutual operation as are the two shafts 226 in stations 12 and 14. In the particular form of the invention shown each of the shafts 104 and 226 is formed with a tongue at one end and a groove at the other end thereof and corresponding shafts in the various stations are properly dimensioned so that they interconnect for mutual operation as shown in Fig. 1. It will be observed (Fig. 1) that the left-hand end of the shaft 104 in station 10 carries a crank arm 252 and that the latter in turn is connected to the piston rod 254 of a piston and cylinder assembly 256. Assembly 256 may be mounted and operated in any suitable or conventional manner and is here shown attached to the supporting framework of conveyor 32. When piston rod 254 is retracted, shafts 104 are rotated in a direction to first locate and then clamp headstocks 16; and when the piston rod is advanced, shafts 104 are rotated in the opposite direction to disengage the locating pins and the clamping arms from the headstocks. Similarly, a crank arm 260 is attached to the outboard end of shaft 226 in the last work station 14, and the crank arm in turn is attached to the piston rod 262 of a piston and cylinder assembly 264. The piston and cylinder assembly 264 operates in an obvious manner to engage or disengage the driving clutch elements 38 with respective driven clutch elements 40.

The indexing mechanism for moving headstocks 16 progressively from station to station comprises a pivoted and slidable bar 266 arranged at the front of and extending substantially the full length of the machine. At spaced points along the length of bar 266 are laterally projecting lugs 268 which engage behind the headstocks 16 and move them on the supporting tracks when the bar is shifted axially. In practice, the bar 266 is pulled to the right as viewed in Fig. 1 to advance carriers 16 and it will be observed that all of the headstocks are moved simultaneously. When all of the headstocks 16 have been advanced one station and the bar 266 is rotated or oscillated to disengage lugs 268 from the headstocks 16, the bar is returned to its initial position, and then rotated in a reverse direction to again bring lugs 268 into position for engagement with the headstocks preparatory to the next operating cycle.

The particular means here shown for actuating bar 266 comprises a pair of piston and cylinder assemblies 270 and 272 and means connecting the assemblies to the bar in such manner that the assemblies control axial and oscillatory movement of the bar. Both piston and cylinder assemblies 270 and 272 are mounted on a suitable supporting framework 274.

As shown in Fig. 1, the piston and cylinder assembly 270 is mounted on the framework 274 parallel and in axial alignment with the bar 266, and the piston rod 276 of the assembly is connected at 278 to the adjacent end of bar 266. When the piston in assembly 270 is retracted, bar 266 is moved to the right as viewed in the drawings; and when the piston is advanced, the bar is moved to the left.

The piston and cylinder assembly 272 is disposed at right angles to and below bar 266. Intermediate the bar 266 and the piston and cylinder assembly 272 is a pivoted rod 280 which is supported adjacent one end by the frame 274 and adjacent the other end thereof by an upstanding support 282. Fixed on opposite ends of the rods 280 are parallel arms 284 and 286 which carry a second rod 288 in spaced parallel relation with respect to the rod 280. A crank arm 290 on the outboard end of rod 280 is pivotally connected to the piston rod 292 of assembly 272, and a crank arm 294 on bar 266 is formed with a notch 296 in the distal end thereof which slidably receives the rod 288 (Figs. 1 and 5). By reason of this construction, the crank arm 294 remains continuously engaged with rod 288 during reciprocation of bar 266, and pivotal movement of rod 280 causes rod 288 to swing in an arcuate path so as to oscillate crank arm 294 and the bar 266 to which it is attached. Manifestly, rod 280 can be oscillated about its axis by actuation of the piston and cylinder assembly 272. Advancement of the piston in assembly 272 causes rod 288 to swing downwardly from the position shown in Fig. 1 so as to oscillate bar 266 to release lugs 268 from work carriers 16. Conversely, retraction of the piston in assembly 272 causes rod 288 to swing upwardly again and to oscillate bar 266 so as to again bring the lugs 268 into position for engagement with the headstocks 16.

The conveyers 24, 28 and 32 here shown are conventional and need not be described in detail. The conveyers 24 and 32 are identical and corresponding parts of the three conveyers are identified by the same numeral.

For convenience conveyer 24 is described specifically. This conveyer comprises a pair of endless chains 298 and 300. Chain 298 is trained over sprockets 302 and 304, and chain 300 is trained over sprockets 306 and 308. Sprockets 302 and 306 are fixed to a shaft 310 and sprockets 304 and 308 are fixed to a shaft 312. Both shafts 310 and 312 are suitably journaled in a supporting framework designated generally by the numeral 314. The framework includes channel members 316 and 318 which are disposed under and support the upper runs of chains 298 and 300, and the chains are provided with upstanding lugs 320 and 322 which push the headstocks from station 22 to station 26. The framework 314 also includes parallel rails 324 and 326 which receive and support the headstocks 16 for movement between the stations 22 and 26.

As the headstocks 16 are moved into station 22 by the indexing mechanism 20, the lugs 320 and 322 engage the pallet portion of the headstock and push the same along the tracks 324 and 326 to station 26.

Conveyer 32 is identically constructed and functions in the same manner as conveyer 24 to transport the headstocks 16 from station 30 to station 34.

Conveyer 28 is identical to conveyer 24 except that, in the particular construction shown, a single chain 328 is employed. The chain 328 is trained over sprockets 330 and 332 on shafts 334 and 336, respectively. It will be readily apparent that conveyer 28 functions in the same manner as conveyer 24 to move the headstocks 16 from station 26 to station 30.

Conveyers 24, 28 and 32 are driven by a single motor 338. In this connection it will be observed that the motor 338 drives the shaft 336 through gears 340, 342 and 344 and that the shaft 336 in turn drives the conveyer chain 328 and the shaft 334. Also, shaft 336 is connected to the shaft 310 of conveyer 24 by bevel gears 346 and 348 to drive both conveyer chains 298 and 300 of conveyer 24 simultaneously. Shaft 334 is similarly connected to shaft 310 of conveyer 32 through bevel gears 350 and 352. Thus, conveyer 28 is driven directly by motor 338 and in turn drives conveyers 24 and 32.

The operation of the machine is as follows: While machining operations are being performed on workpieces 18 in stations 12 and 14 the operator unloads and loads in station 10. After the machining operations are completed, the tools are retracted either manually or by conventional automatic means, the piston and cylinder assemblies 256 and 264 are actuated to withdraw locating pins 98, to disengage clamping arms 116 and 118, and to retract the driving couplings 38 from the driven couplings 40. The piston and cylinder assembly 270 is then operated to advance all of the headstocks 16 one station to the right, as viewed in Fig. 1. This operation moves a headstock from the transfer station 8 to the loading and unloading station 10, advances a headstock from the loading and unloading station into the first work station 12 for the first machining operation, advances a headstock from the first work station 12 to the second work station 14 for a second machining operation, and advances a headstock from the last work station to the transfer station 22. As soon as the headstocks 16 have been indexed, the piston and cylinder assembly 256 is actuated to locate and clamp the headstocks in stations 10, 12 and 14, and the piston and cylinder assembly 264 is then actuated to engage the driving couplings 38 with their respective driven couplings 40. The machine tools 236 and 238 are then operated to perform their respective operations on the workpieces 18. Also, after the indexing operation is completed, the piston and cylinder assembly 272 is operated to disengage lugs 268 from the headstocks, and piston and cylinder assembly 270 is then actuated to return the bar 266 to its initial position. The assembly 272 is then operated to swing the lug 268 again into operative association with the headstocks 16 preparatory to the next cycle of operation. The conveyers 24, 28 and 32 may be operated either continuously or intermittently, and, in either event, suitable conventional controls are provided for assuring proper interaction between the indexing mechanism 20 and the first conveyer. While the machining and other operations are being performed, the headstock transferred to station 22 is moved by conveyer 24 to transfer station 26, then to transfer station 30 by conveyer 28, and then by conveyer 32 to station 8 where it waits to be transferred to station 10 for loading and unloading on the next cycle of operation.

It may thus be seen that I have achieved the objects of my invention. I have devised a machine for performing a series of operations on a workpiece that can be made fully automatic in operation if desired. The machine is uniquely constructed, and the various parts of the machine are combined and correlated in such manner that the work stations can be individually made and readily assembled for mutual synchronized operation. The construction is such that there is no limit to the number of stations which may be incorporated into one machine. Moreover, the work stations can be assembled in any desired manner and in any selected sequence or order according to the exigencies of the particular situation. By reason of the fact that the machine is constructed from a number of relatively small, self-contained units, it is much easier to manufacture and repair.

In addition to the above, the machine here shown and described has the capacity for producing more accurate results because the method of indexing the work spindles from station to station eliminates many of the errors inherent in the more conventional rotary type machines. For example, in the rotary type machine it is necessary to have all the spindles index within a true circle, it is necessary to have all the spindles accurately spaced in relation to one another, and it is essential that all the spindles be accurately spaced in relation to the indexing shot bolt. In the instant machine, on the other hand, the work spindles may be located individually at each station without relation to one another.

Another advantage of the present machine is that chatter or vibration generated at one station cannot be transferred back through the spindle drive mechanism to other stations because the drive is independent for each station. This prevents vibration created in one station from compounding with vibrations from other stations and thus affecting the machining operations in all the stations.

It will be observed that in the present apparatus all of the machine tools are arranged so that both the machines and the cutting tools are readily accessible. This permits necessary repairs to be made easily and quickly on the machines and permits tools to be changed quickly and without difficulty. Special tooling and attachments can be more easily applied to the machine because more room is available for the tools.

In certain types of parts it is desirable to perform operations on both ends before releasing the parts from the work-holding device. This is true, for example, in the case of axles and similar parts where it is desirable to maintain concentricity between the ends. With design modifications readily apparent to any skilled mechanic, the instant machine can be arranged to operate on both ends of a workpiece from opposite ends of a work spindle. Also, in this connection, it will be readily apparent that, although the machine here shown is adapted to perform turning operations on the work, other operations such as drilling and milling can be performed on the machine by holding the work spindles stationary in stations adapted for this purpose.

Having thus described the invention, I claim:

1. In a multiple-station machine tool, a series of in-line work stations having aligned track sections and each equipped with a rotatably driven drive shaft and locating and clamping mechanisms; a portable headstock including mechanism having a rotatably driven shaft for rotatably driving work on said headstock, and a supporting pallet; means for indexing said headstock progressively from one work station to another on said track sections, and said headstock being engageable by the locating and clamping mechanism in each station to position the driven shaft in alignment with the drive shaft of such station; means for coupling the drive shaft of the station occupied by the headstock with the driven shaft of said headstock after the latter has been acted upon and is held stationary by the locating and clamping mechanisms of such stations; and automatic transfer means arranged to receive the headstock as it is indexed from the last work station and operable to move such headstock to the first station in said series.

2. In a multiple-station machine tool, a series of in-line work stations having aligned track sections, each station equipped with a rotatable and reciprocable drive shaft having a driving coupling and locating and clamping mechanisms; a plurality of portable headstocks movable successively from station to station on said track sections, each headstock including a supporting pallet and mechanism for holding and rotating work on the headstock, said mechanism including a driven shaft having a driven coupling, the pallets of said headstocks being engageable by the locating and clamping mechanisms in said stations to position the driven shafts of the headstocks in alignment with the drive shaft of such station; means for reciprocally actuating said drive shafts to engage the driving couplings with said driven couplings when the headstocks are held stationary and properly positioned by said clamping and locating mechanisms; mechanism for indexing said headstocks simultaneously from station to station; and an automatic transfer device located to receive headstocks indexed from the last work station and operative to move such headstock to the first station in the series preparatory to engagement by said indexing means.

3. Apparatus for handling and rotatably driving workpieces for machining operations and the like comprising a series of in-line work stations having aligned track sections, each of said stations being equipped with a rotatable and reciprocable drive shaft having a driving coupling and locating and clamping mechanisms, a plurality of portable headstocks movable successively from station to station on said track sections, mechanism for indexing said headstocks simultaneously from station to station, each headstock including a supporting pallet and mechanism for holding and rotating work on the headstock, said mechanism including a driven shaft having a driven coupling, the pallets of said headstocks being engageable by the locating and clamping mechanisms in said stations to position the driven shafts of the headstock in alignment with the drive shaft of such station, means for reciprocably actuating said drive shafts when the headstocks are held stationary and properly positioned by said clamping and locating mechanisms to engage the driving couplings with said driven couplings, a separate power source for each of said drive shafts, said power sources being operative to satisfy different power requirements of said stations and each power source being completely independent of the others so that an operation being performed in one work station does not interfere with operations being performed in other work stations, and an automatic conveyer apparatus located to receive headstocks indexed from the last work station in the series and operative to move such headstocks to the first station in the series preparatory to engagement by said indexing means.

4. Apparatus for handling and rotatably driving workpieces for machining operations and the like comprising a series of in-line work stations having aligned track sections, each of said stations being equipped with a rotatable and reciprocable drive shaft having a driving coupling and locating and clamping mechanisms, a plurality of portable headstocks movable successively from station to station on said track sections, mechanism for indexing said headstocks simultaneously from station to station each headstock including a supporting pallet and mechanism for holding and rotating work on the headstock, said mechanism including a driven shaft having a driven coupling, the pallets of said headstocks being engageable by the locating and clamping mechanisms in said stations to position the driven shafts of the headstock in alignment with the drive shaft of such station, means for reciprocably actuating said drive shafts when the headstocks are held stationary and properly positioned by said clamping and locating mechanisms to engage the driving couplings with said driven couplings, and a separate power source for each of said drive shafts.

5. Apparatus for handling and rotatably driving workpieces for machining operations and the like comprising a series of in-line work stations, track elements providing a continuous way through said work stations, portable headstocks each dissociated and disconnected from the others and independently movable through said work stations on said way, said headstocks including mechanisms for holding and rotating work on said headstocks, said mechanisms including driven couplings, separate drives in said stations each having a separate power source and including driving couplings arranged to align with the driven couplings of the headstock mechanisms as the headstocks move into said stations, means for locating said headstocks individually in said stations with the driven coupling of each headstock mechanism positioned for engagement by the driving coupling of the station, means for clamping and holding said headstocks in said stations and in the located positions, means for selectively connecting the driving couplings of the stations occupied by the headstocks to the driven couplings of said headstock mechanisms, a transfer mechanism for indexing said headstocks from station to station when said driving couplings are disconnected from said driven couplings, and an automatic conveyer mechanism arranged to receive each headstock as it is indexed from the last station in the series and operative to return such headstock to the first station in the series.

6. Apparatus for handling and rotatably driving workpieces for machining operations and the like comprising a series of in-line work stations, a separate drive in each station, each drive having a separate power source and including a rotatable, slidable driving clutch element, a track extending through said work stations, portable headstocks each dissociated and unconnected from the others, said headstock being independently movable through said work stations on said track and being independently positionable on the track for a machining operation to be performed thereon each of said headstocks including mechanism for holding and rotating work on the headstock, said mechanism including a clutch element engageable with respective driving clutch elements in said stations, means for indexing said headstocks progressively from one work station to another, means for locating said headstocks separately in each station with the driven clutch elements positioned for engagement by the driving clutch elements of such stations, means for clamping and holding said headstocks in the located positions in said stations, and means for sliding each of said driving clutch elements into and out of engagement with said driven clutch elements.

7. Apparatus for handling and rotatably driving workpieces for machining operations and the like including a series of in-line work stations, each station having a separate, stationary, rotary driving means provided with driving coupling means and including a track extending through said work stations, a separate power source for each of said driving means, a plurality of portable headstocks each dissociated from the others and independently movable through said work stations on said tracks and positionable on the tracks in said stations, each headstock including mechanism for holding and rotating work carried thereby, said mechanism including driven coupling means normally disengaged from but engageable by the driving coupling means in each station, means for indexing said headstocks progressively from one station to another, means for locating said headstock in each of said stations with the driven coupling means positioned for engagement by the driving coupling means of said station, means operable in timed relation with said locating means for clamping and holding said headstocks in said stations, and means for connecting the driving coupling means of the stations occupied by the headstocks to the driven coupling means of said mechanisms.

8. A machine tool comprising a series of in-line machine units constituting work stations, a plurality of portable headstocks having rotatable work holders including rotatably driven parts, each headstock being dissociated and disconnected from the others for independent movement through said work stations, a transfer mechanism coactive with said headstocks for moving the same progressively and in succession through said work stations, mechanism in each work station for locating and clamping said headstocks therein so as to hold the same stationary during machining operations on said workpieces, a separate drive in each station, said drives including rotatable driving parts selectively engageable with and disengageable from the driven parts of said work holders when the latter are positioned in the stations by said locating and clamping mechanisms, and a separate power source for each of said drives.

9. A machine tool comprising a series of in-line machine units constituting work stations, said units having individual track sections, a plurality of portable headstocks having rotatable work holders, each headstock being dissociated from the others and independently movable through said work stations on said track sections and being also positionable on said track sections to locate work carried by said work holders for machining operations, means for indexing said headstocks successively and progressively through said work stations, mechanism in each work station for locating and clamping said headstocks therein so as to hold the same stationary during machining operations on said workpieces, a separate drive in each station, each drive having a separate power source and including a driving part for rotatably actuating the work holder of a headstock in said station, and means detachably connecting said locating, clamping and driving mechanisms for mutual operation, said means being readily disengageable so that various numbers of units can be incorporated in the machine.

10. Apparatus for handling and driving workpieces for machining operations and the like comprising a series of work stations, portable headstocks having rotatable workholding means, each headstock being dissociated and disconnected from the others and independently movable through and positionable in said work stations, means for moving said headstocks progressively and in succession from one station to another, a conveyer operable in timed relation with said last-mentioned means arranged to receive headstocks from the last station in the series and to transport the same to the first station in the series, means in each station for locating and clamping said headstocks therein so as to hold the same stationary while a machining operation is performed on work carried thereby, and a separate drive in each station, each drive having a separate power source and being engageable with and adapted to rotatably drive said work-holding means while said headstocks are held stationary in said predetermined positions by said locating and clamping means.

11. Apparatus for handling and actuating workpieces for machining operations and the like comprising a plurality of work stations, portable headstocks each dissociated and disconnected from the others and independently movable through and positionable in said work stations, means for moving said headstocks progressively and successively from one station to another, means in said work stations for locating and clamping said headstocks in predetermined positions to hold said headstocks stationary while work is performed on workpieces carried thereby, and a separate drive in each station, each drive having a separate power source for rotatably driving the headstocks in said stations while the headstocks are held stationary in said predetermined positions by said locating and clamping means.

12. Apparatus for handling and rotatably driving workpieces for machining operations and the like comprising a series of in-line work stations having aligned track sections, each of said stations being equipped with rotatable and reciprocable driving coupling means, portable headstocks movable successively from station to station on said track sections, each headstock including mechanism for holding and rotating work on the headstock and said mechanism being provided with driven coupling means, locating and clamping mechanisms in said stations engageable with said headstocks to position said driven coupling means in alignment with said driving coupling means, and means for reciprocably actuating said driving coupling means when said headstocks are held stationary and properly positioned by said clamping and locating mechanisms to engage said driving coupling means with said driven coupling means.

13. A machine tool comprising a series of in-line machine units constituting work stations, a plurality of portable headstocks having rotatable work holders including rotatably driven parts, each headstock being dissociated and disconnected from the others for independent movement through said work stations, a transfer mechanism coactive with said headstocks for moving the same progressively and in succession through said work stations, mechanism in each work station for locating and clamping said headstocks therein so as to hold the same stationary during machining operations on said workpieces, and drive means in said stations, each adapted to the power requirements of its particular station, said drive means being selectively engageable with and disengageable from the driven parts of said work holders when the latter are positioned and held in the stations by said locating and clamping mechanisms.

14. Apparatus for handling and driving workpieces for machining operations and the like comprising a series of work stations, portable headstocks having rotatable work-holding means, each headstock being dissociated and disconnected from the others and independently movable through and positionable in said work stations, means for moving said headstocks progressively and in succession from one station to another, a conveyer operable in timed relation with said last-mentioned means arranged to receive headstocks from one of said stations and to transport said headstocks from said station, means in each station for locating and clamping said headstocks therein so as to hold the same stationary while a machining operation is performed on work carried thereby, and a separate drive in each station selectively engageable with and adapted to rotatably drive said work-holding means while said headstocks are held stationary in said predetermined positions by said locating and clamping means.

15. Apparatus for handling and actuating workpieces for machining operations and the like comprising a plurality of work stations, portable headstocks each dissociated and disconnected from the others and independently movable through and positionable in said work stations, means for moving said headstocks progressively and successively from one station to another, means in said work stations for locating and clamping said headstocks in predetermined positions to hold said headstocks stationary while work is performed on workpieces carried thereby, and separate drives in said stations for rotatably driving the headstocks in said stations while the headstocks are held stationary in said predetermined positions by said locating and clamping means.

References Cited in the file of this patent

UNITED STATES PATENTS

| | | |
|---|---|---|
| 409,674 | Fairfield et al. | Aug. 27, 1889 |
| 617,567 | Flather | Jan. 10, 1899 |
| 759,074 | Cahill | May 3, 1904 |
| 1,304,566 | Hornsbrook | May 27, 1919 |
| 1,511,662 | Dirkson et al. | Oct. 14, 1924 |
| 1,829,284 | Lewis | Oct. 27, 1931 |
| 1,970,779 | Spikerman | Aug. 21, 1934 |
| 2,028,008 | Peyinghaus | Jan. 14, 1936 |
| 2,048,960 | Tiedmann | July 28, 1936 |
| 2,058,498 | Perry | Oct. 27, 1936 |
| 2,063,955 | Schiltz | Dec. 15, 1936 |
| 2,120,966 | Clark | June 21, 1938 |
| 2,249,230 | Schafer | July 5, 1941 |
| 2,302,878 | Muhl | Nov. 24, 1942 |
| 2,371,906 | Millholland | Mar. 20, 1945 |